Sept. 11, 1962  C. J. JINKINS, JR  3,053,401
DRILL PIPE HANDLING APPARATUS
Filed Aug. 21, 1959  3 Sheets-Sheet 1
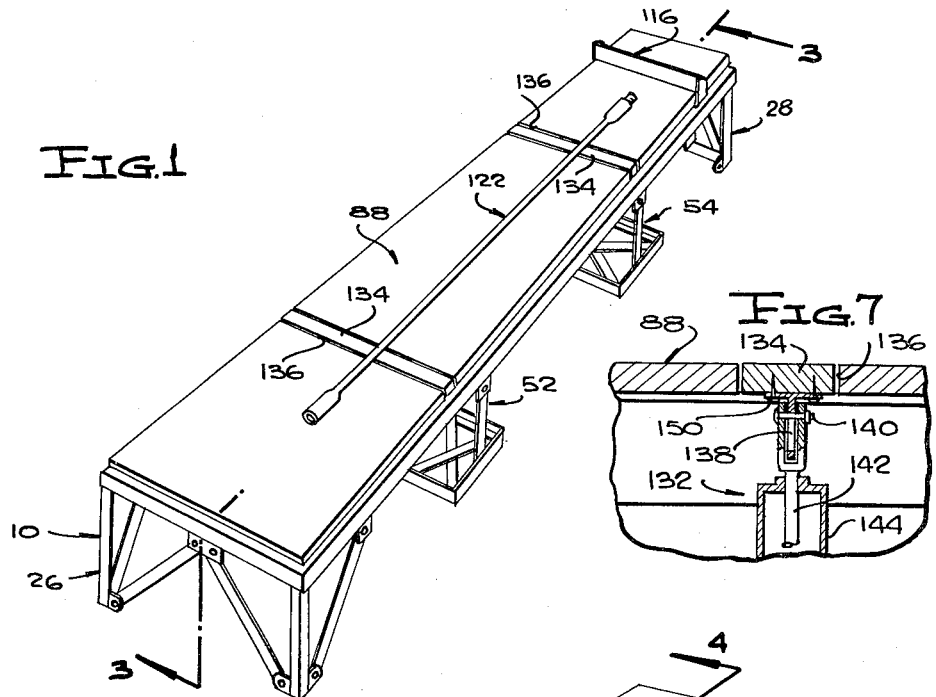
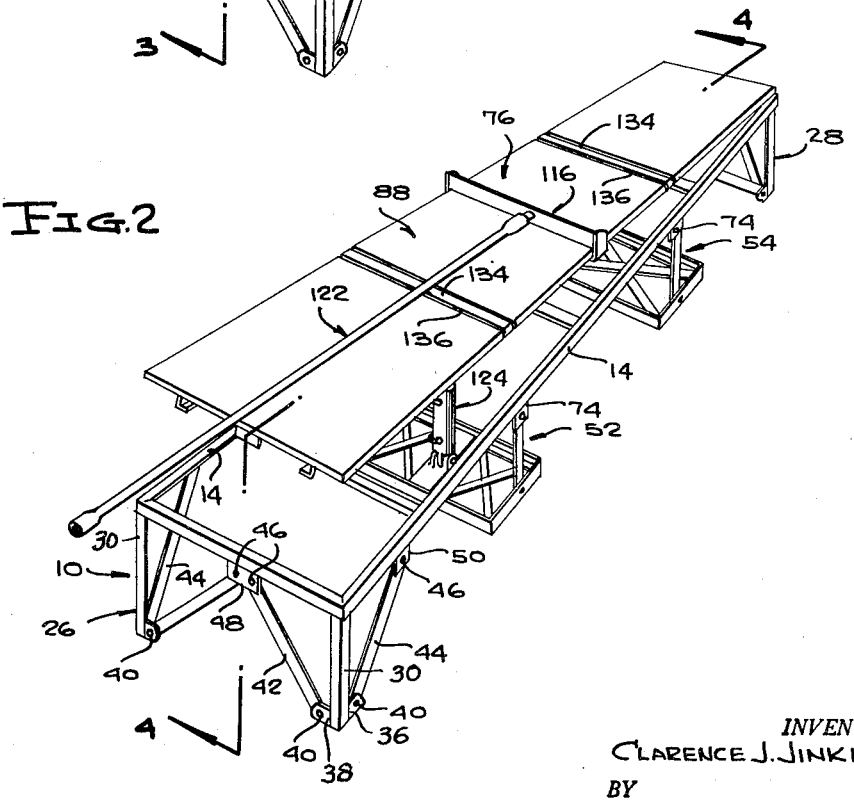
INVENTOR.
CLARENCE J. JINKINS, JR.
BY
McMorrow, Berman & Davidson
ATTORNEYS

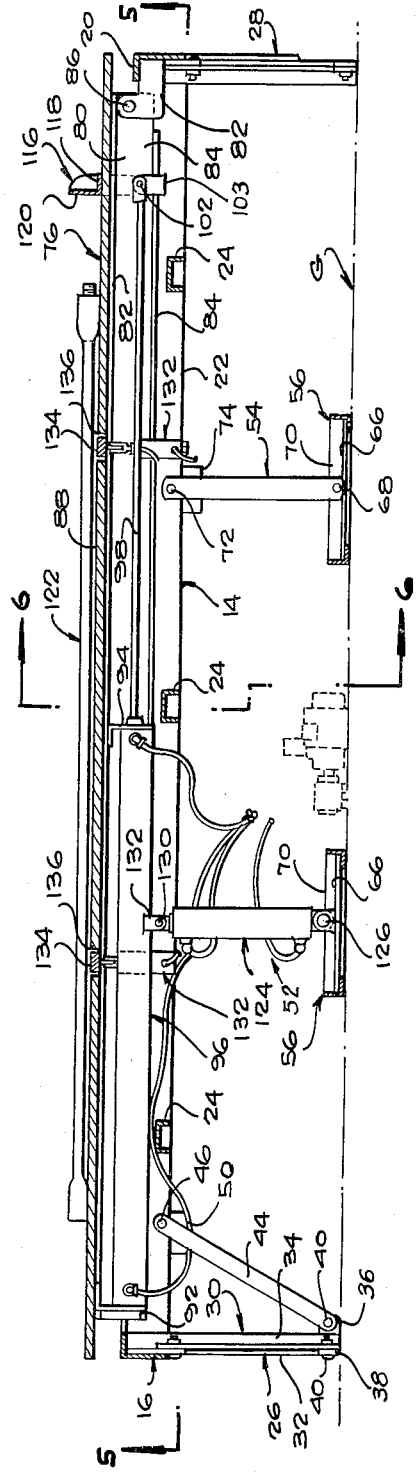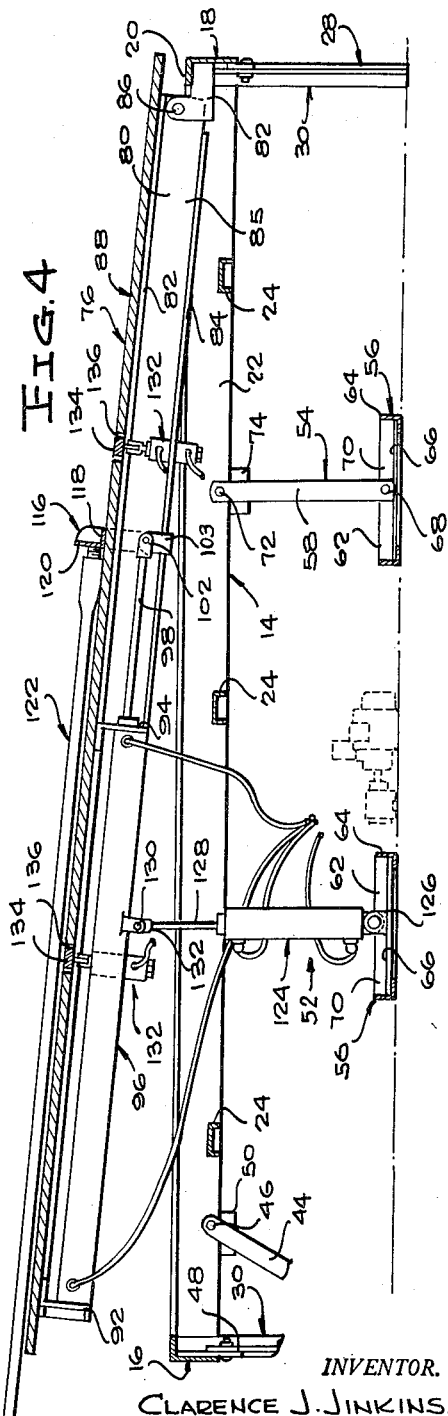

Sept. 11, 1962 C. J. JINKINS, JR 3,053,401
DRILL PIPE HANDLING APPARATUS
Filed Aug. 21, 1959 3 Sheets-Sheet 3
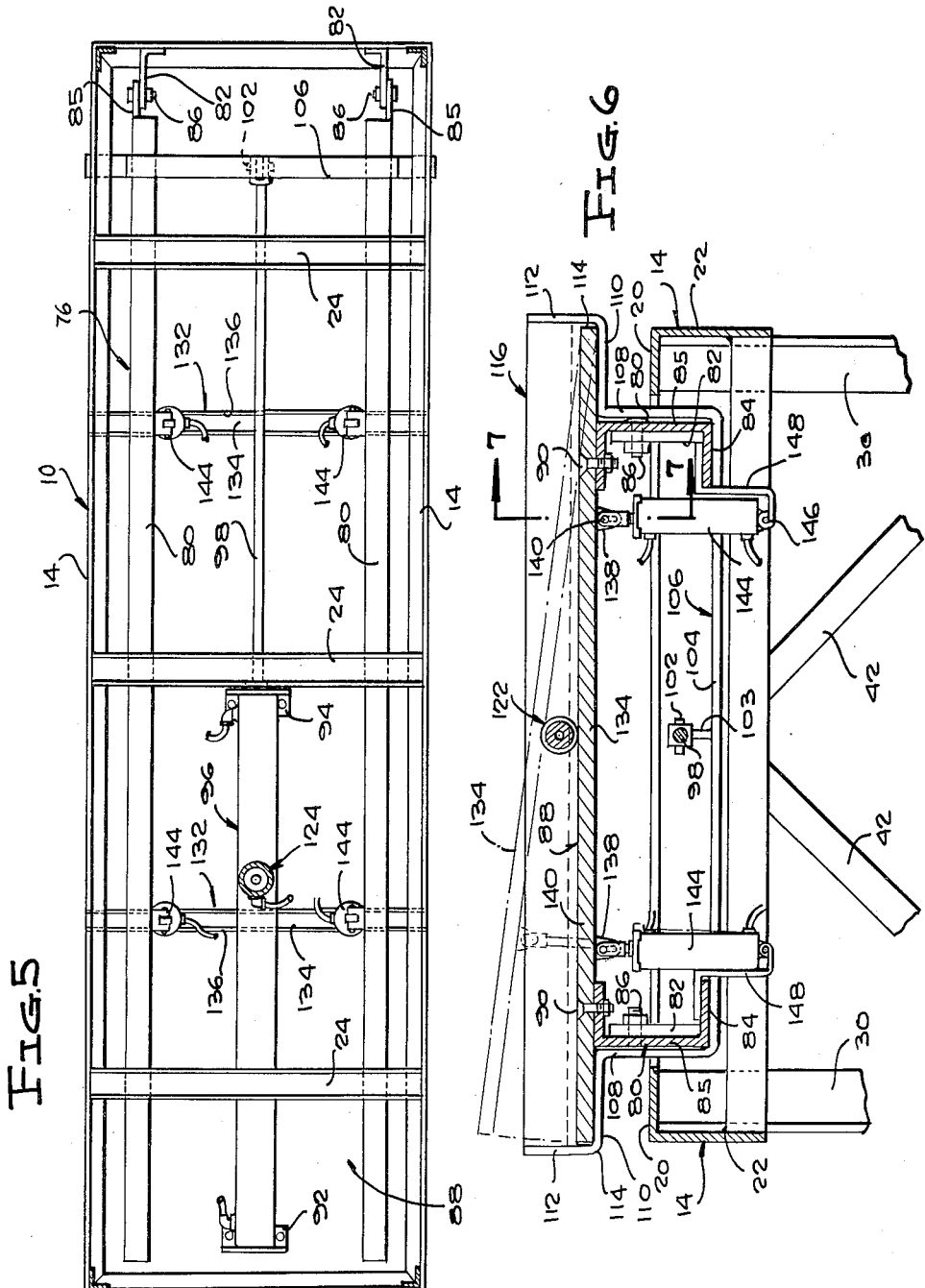
INVENTOR.
CLARENCE J. JINKINS, JR.
BY
McMorrow, Berman & Davidson
ATTORNEYS

United States Patent Office 3,053,401
Patented Sept. 11, 1962

3,053,401
DRILL PIPE HANDLING APPARATUS
Clarence J. Jinkins, Jr., Hobbs, N. Mex.
(Box 6147, Crestwood Station, Odessa, Tex.)
Filed Aug. 21, 1959, Ser. No. 835,357
2 Claims. (Cl. 214—2.5)

This invention relates to a novel drill pipe handling apparatus.

The primary object of the invention is to provide a more efficient and versatile apparatus of the kind which greatly facilitates and renders more accurate the handling of drill pipe joints and collars relative to drilling rigs, and reduces the labor and losses of time involved in such handling.

Another object of the invention is to provide apparatus of the kind indicated which has a ramp or platform which is endwise power-tiltable to angle pipe deposited thereon to positions to be readily reached from a drilling rig floor by elevators, the ramp having thereon pipe supporting dump rails which are power-tiltable, crosswise of the ramp, to roll pipe off the ramp to either side of the ramp, together with power-driven means for sliding pipe along the ramp to within reach of elevators on a drilling rig floor.

A further object of the invention is the provision of apparatus of the character indicated above which eliminates the need for pipe racks at one or both sides of the ramp, and the time lags and the labor of handling of pipe therefrom onto the ramp, the said apparatus enabling direct loading of pipe, according to requirements, upon the ramp; and the easily controlled operation of the components of the apparatus reduces the amount of exertion and the number of workmen otherwise required.

A still further object of the invention is to provide apparatus of the character indicated above which is uncomplex in construction, is composed of a relatively small number of simple and easily assembled parts, so as to be capable of being made in rugged and serviceable forms at relatively low cost, and which occupies a minimum of ground space and head-room at the side of a drilling rig.

Other important objects and advantageous features of the invention will be apparent from the following description and the accompanying drawings, wherein, for purposes of illustration only, a specific form of the invention is set forth in detail.

In the drawings:

FIGURE 1 is a perspective view of apparatus of the invention, the ramp and the dump rails being in depressed untilted positions, and the dolly being at the bar or lower end of the ramp;

FIGURE 2 is a view similar to FIGURE 1, showing the ramp in a tilted position, with the dolly advanced up the ramp and pushing a pipe joint or section upwardly off the ramp;

FIGURE 3 and FIGURE 4 are enlarged vertical longitudinal sections taken on the line 3—3 of FIGURE 1 and 4—4 of FIGURE 2, respectively;

FIGURE 5 is a horizontal section taken on the line 5—5 of FIGURE 3;

FIGURE 6 is an enlarged fragmentary vertical transverse section taken on the line 6—6 of FIGURE 3; and FIGURE 7 is a further enlarged fragmentary vertical longitudinal section taken on the line 7—7 of FIGURE 6.

Referring in detail to the drawings, wherein like numerals designate like parts throughout the several views, the illustrated apparatus comprises a longitudinally elongated ground-engaging main frame 10, preferably composed of bolted and welded structural members, so as to be capable of being disassembled for transport and assembly at the site of a drilling rig.

The frame 10 is an open rectangular form 10 composed of similar side members 14 and similar forward and rear end members 16 and 18, respectively. The side and end members are preferably angle irons, secured together at related ends, as by welding, and are inverted to have horizontal flanges 20 extending inwardly and vertical flanges 22 depending from the outer edges of the horizontal flanges 20. At longitudinally spaced intervals along the frame 10, channel cross members 24 are fixed, as by welding, at related ends thereof to the vertical flanges 22 of the side members 14.

Trussed, ground-engaging supports 26 and 28 are removably and severally secured to and support forward and rear ends of the frame 10, parallel above the ground G or other supporting surface. The supports 26 and 28 are preferably similar in construction, comprising perpendicular angle irons 30 which are suitably secured, at their ends, within related corners of the frame, these angle irons having fixed on their transverse and longitudinal flanges 32 and 34, respectively, transverse and longitudinal lugs 36 and 38, respectively, to which are bolted, as indicated at 40, the lower ends of transverse and longitudinal diagonal truss bars 42 and 44, respectively. The open ends of the diagonal truss bars 42 and 44 are bolted, as indicated at 46, to common lugs 48 depending from related frame end members, and lugs 50 depending from related frame side members. If desired, and as seen in the drawings, the rear supports 28 can be used without longitudinal diagonal longitudinal truss bars 44.

Providing support for the frame 10, at points intermediate the length thereof, and located between adjacent cross members 24, are similar forward and rear floating supports 52 and 54, respectively, which comprise transversely elongated ground-engaging bases 56 and standards 58 rising from the ends of the bases. The bases preferably comprise open horizontal rectangular frames composed of fixedly connected angle irons, including end members 62 and side members 64, the frames being crossbraced, as indicated at 66. The standards 58 are preferably flat bars which are bolted, as indicated at 68, at their lower ends, to the upstanding flanges 70 of the end members 62, and are bolted at their upper ends, as indicated at 72, to fixed lugs depending from the sub-frame side members 14. This arrangement enables the floating supports to be readily assembled and reassembled to the frame 10, and to be angled relative thereto, to provide firm support on uneven ground.

The illustrated apparatus further comprises a longitudinally elongated ramp assembly, generally designated 76, which comprises an elongated open rectangular ramp frame, having parallel side members 80, preferably inwardly facing channel irons having upper and lower flanges 82 and 84, respectively, the ramp frame being devoid of an end member at its forward and rear ends. As shown in FIGURE 5 and FIGURE 6, the ramp frame 78 is hinged at its rear end to the rear frame end member 18, by means of brackets 82 reaching forwardly from and above the end member 18 and webs 85 of the side members 80, along the inward sides of the webs 85, the brackets 82 and the webs 85 being traversed by pivot bolts 86, which pivot the assembly 76 on a level above the sub-frame 12.

The ramp assembly 76 further comprises a flat ramp plate 88 which can be as wide and as long as the main frame 10, and is bolted, as indicated at 90 to the upper flange 82 of the ramp frame side members, as shown in FIGURE 6, and extends laterally outwardly beyond the side members 14 of the frame 10, to sometimes rest thereupon.

Suitably fixed to the underside of the ramp plate 88 and spaced centrally and longitudinally therealong, are forward and rear brackets 92 and 94, respectively, the forward bracket 92, as seen in FIGURE 4, being located on the forward end of the plate. Suitably secured to and extending between the brackets 92 and 94, is a hydraulic cylinder 96, which has a piston rod 98 extending rearwardly therefrom and having a clevis 100 on its rear end. The clevis 100 is pivoted, as indicated at 102, to the upper end of an arm 103 upstanding from a central part of the horizontal bight portion 104 of a generally U-shaped slide 106. The slide 106 has on its ends upstanding flat legs 108, positioned at the outward sides of the ramp frame side members 80, with the bight portion 104 engaged with the lower flanges 84 of the side members 80. The legs 108 have on their upper ends L-shaped elements which include horizontal portions 110 which bear against the underside of the ramp plate 88, outwardly of the side members 80, and upstanding perpendicular arms 112 which bear against related side edges 114 of the plate 88, and rise thereabove, as shown in FIGURE 6. Sliding along the upper surface of the ramp plate 88 and extending thereacross and suitably fixed at its ends to the perpendicular arms 112, is a follower bar 116. The bar 116 is preferably of angle iron form, providing a horizontal flange 118, sliding on the dolly plate, and an upstanding vertical flange 120, on the forward edge of the flange 118, to provide an abutment for engaging the rear end of such as a drill pipe section 122, laid lengthwise upon the ramp plate 88, as seen in FIGURE 4. The hydraulic cylinder 96 is controlled in suitable manner (not shown) for moving its piston rod 98 forwardly, so as to move the follower bar 116 forwardly along the ramp plate 88, to push a pipe section 122 forwardly therealong, and for moving its piston rearwardly, to put the bar 116 at the rear end of the ramp plate 88, preparatory to pushing pipe sections therealong.

For elevating and depressing the ramp assembly 76 relative to the frame 10, on the axis of the pivot bolts 86, a single vertical elevating hydraulic cylinder 124 is provided, which is pivotally mounted, at its lower end, as indicated at 126, centrally on the truss work 66 of the base of the forward floating support 52, and has an upstanding piston rod 128 which is pivoted at its upper end, as indicated at 130, to a fixed lug 132 depending from an intermediate part of the hydraulic cylinder 96, as is clear from FIGURES 3 and 4, the cylinder 124 having suitable control means (not shown) for extending and retracting the piston rod 128, to elevate and depress the ramp assembly 76 relative to the frame 10, as may be required to angle pipe sections 122 to be easily reached by elevation on a drilling rig floor (not shown).

For elevating such as a pipe section 122 off the ramp plate 88, and for gravitationally dumping pipe section off the damp plate 88, to either side thereof, dumping means is provided on the ramp assembly 76, and is independent of the frame 10. This dumping means comprises at least one, and preferably two or more similar dumping assemblies 132, disposed at points spaced from the ends of the ramp assembly 76 and spaced from each other. Each dumping assembly 132 comprises a flat rail 134, extending crosswise of the ramp plate 88, in a transverse slot 136 provided in the ramp plate, as seen in FIGURES 6 and 7, and having at opposite ends thereof fixed depending lugs 138 to which are pivoted, as indicated at 140, the upper ends of the upstanding piston rods 142 of dumping rail tilting hydraulic cylinders 144. The cylinders 144 are pivotally mounted at their lower ends, as indicated at 146, on brackets 148, suitably secured to and extending below the lower flanges 84 of the ramp frame side members 80, at the laterally inward sides thereof. As indicated in FIGURE 7, the dumping rails 134 are preferably of wood, for non-impervious contact with such as pipe sections 122, and the pivot lugs 138 are secured thereto, as indicated at 150. Suitable control means (not shown) for operating the cylinders 144 is provided, which is operable to depress either end of a dumping rail 134 while elevating the other end thereof, as indicated in phantom lines in FIGURE 6, in order to roll a pipe section over the side of the ramp plate 88 toward which the rail is tilted.

As shown in FIGURE 3, the various hydraulic cylinders can be severally connected by conduit means, generally designated 152, to compressor 154 of a portable pressure pump unit 156 having a suitable driving motor, such as an electric motor 158, the compressor 154 having thereon suitable selective control levers, indicated generally at 160.

It will be understood that reference hereinabove to hydraulic cylinders is intended to comprehend the term hydraulic jacks, and does not exclude mechanical jacks.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A drill handling apparatus comprising a horizontal longitudinally elongated ground-supported main frame, having forward and rear ends, a longitudinally elongated ramp assembly extending lengthwise of said frame, said assembly comprising a ramp frame pivoted at its rear end on the main frame at the rear end thereof, a ramp plate fixed upon and extending along and across said ramp frame, and means for elevating and depressing said ramp assembly relative to the main frame, a slide mounted on said ramp assembly for forward and rearward movement along the assembly, said slide having a slide bar extending across and upstanding from the upper surface of the ramp plate, and means for operating said slide forwardly and rearwardly and, a dumping assembly mounted on the ramp assembly comprising a transverse dumping rail extending crosswise of the ramp plate, and tilting means for tilting said rail above the ramp plate and toward either side of the ramp plate, said ramp plate having a transverse slot in which said dumping rail is located, said tilting means comprising jacks mounted on the ramp frame at opposite sides thereof, said jacks having piston rods pivoted to the dumping rail at related ends thereof.

2. A drill handling apparatus comprising an elongated horizontal open rectangular main frame, means for supporting said main frame above the ground, a ramp assembly comprising an open rectangular ramp frame, said ramp frame being narrower and shorter than said main frame and positioned within said main frame, said frames being pivoted together at one end, a ramp plate extending along and across said ramp frame and fixed thereto, and ground engaging jack means connected to said ramp frame for elevating and depressing the ramp assembly relative to the main frame, said ramp frame having longitudinal side members, said ramp plate having a transverse slot therein, a dumping rail extending along said slot, and jacks mounted on the ramp frame side members beneath and connected to related ends of the dumping rail.

References Cited in the file of this patent

UNITED STATES PATENTS

| | | |
|---|---|---|
| 742,585 | Butler | Oct. 27, 1903 |
| 2,535,546 | Pitts | Dec. 26, 1950 |
| 2,631,741 | Tucker | Mar. 17, 1953 |
| 2,743,823 | Breedlove | May 1, 1956 |
| 2,748,965 | Grey | June 5, 1956 |
| 2,852,147 | Maydew | Sept. 16, 1958 |
| 2,900,091 | Minter | Aug. 18, 1959 |

FOREIGN PATENTS

| | | |
|---|---|---|
| 779,907 | Great Britain | July 24, 1957 |